Feb. 10, 1970  W. J. SCHLAPMAN ET AL  3,494,667

TRAILING VEHICLE

Filed April 2, 1968  2 Sheets-Sheet 1

INVENTORS
WILLIAM J. SCHLAPMAN.
ROYAL C. LEEMAN.
BY SETTLE, BATCHELDER & OLTMAN.
ATT'YS.

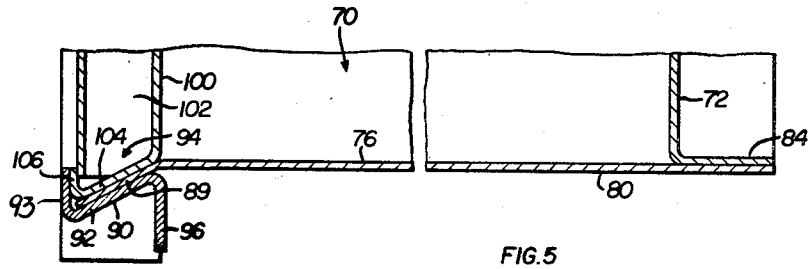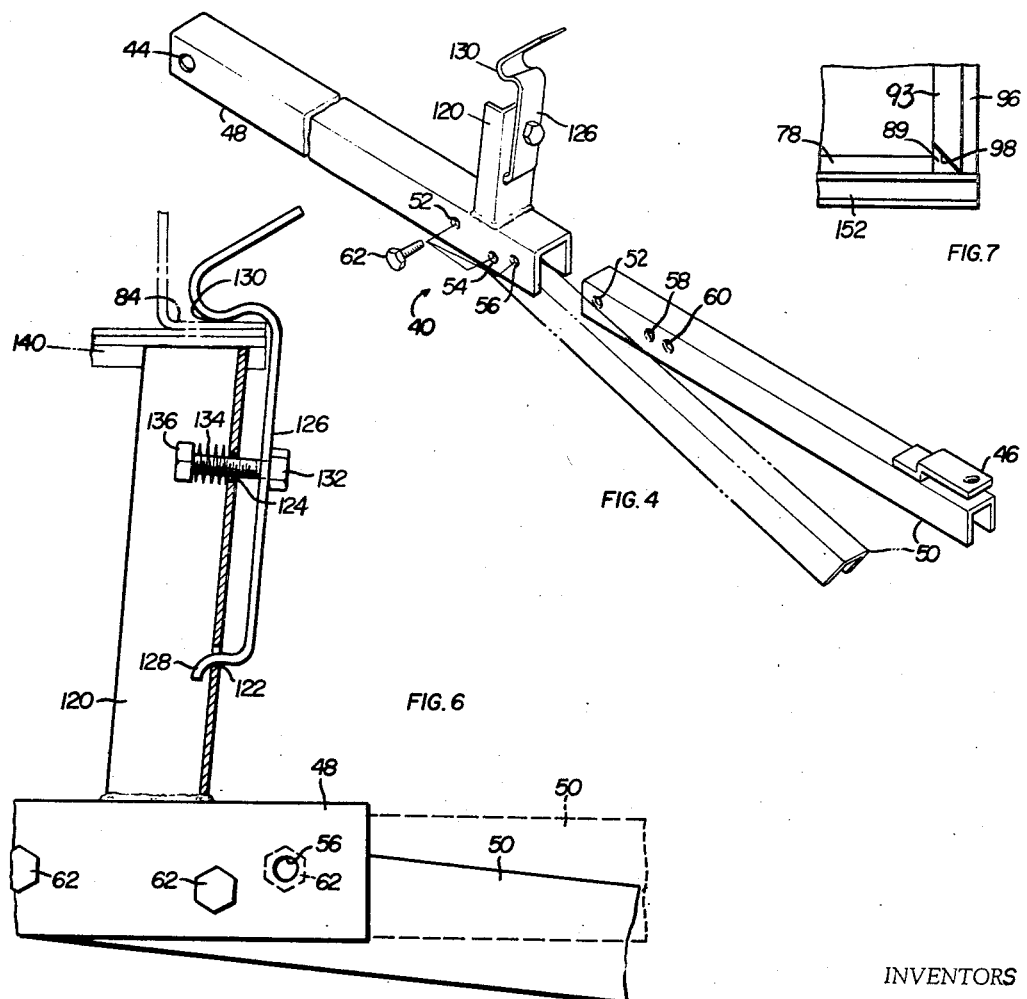

United States Patent Office 3,494,667
Patented Feb. 10, 1970

3,494,667
TRAILING VEHICLE
William J. Schlapman, Winneconne, and Royal C. Leeman, Shiocton, Wis., assignors to J. I. Case Company, Racine, Wis., a corporation of Wisconsin
Filed Apr. 8, 1968, Ser. No. 719,534
Int. Cl. B62b *1/00;* B62c *1/00;* B62d *61/00*
U.S. Cl. 298—5                  16 Claims

ABSTRACT OF THE DISCLOSURE

A two-wheel dump cart having a body defining a completely smooth interior surface and supported along the entire width on axle support means and spaced wheels. The axle is likewise supported along a major portion of the length to prevent distortion and the drawbar is connected directly to the axle. The drawbar is adjustable to vary the vertical position of the point of connection to a draft vehicle while maintaining the body substantially horizontal. Improved latch means are carried by the drawbar and cooperate with the body to releasably retain the body in fixed position relative to the drawbar.

Background of the invention

The present invention relates to trailing vehicles and more particularly to an improved two-wheel dump cart.

Two-wheel trailers have been available for decades. However, all of the commercial structures known to applicant have several serious drawbacks. The primary disadvantage of a conventional two-wheel trailer is the fact that the axle is generally supported at spaced points through axle support means bolted or otherwise fixedly secured to the sides of the body and extending below the body. This leaves the entire length of the axle between the spaced supports on opposite sides of the body unsupported. Thus, a full load on the trailer body will cause the axle to bow downwardly.

Another disadvantage in this type of construction is the fact that the body is substantially unsupported intermediate the sides thereof which will cause the body to deform when a full load is carried by the trailer. Of course, suitable reinforcing means may be provided in this arrangement but reinforcing means add to the weight as well as the cost of the trailer.

Also in the design of trailers in the above type which are capable of being dumped, a complete frame is generally designed having elements pivoted relative to each other and the body is supported on one of the elements. Again such arrangement adds to the cost as well as the weight of a trailer.

Another great disadvantage in the construction of prior art devices is the fact that generally the body must have holes and/or overlapping joints in the construction thereof, the holes being required for reception of bolts for attaching the body parts to each other and to the frame of the trailer.

Summary of the invention

The present invention alleviates all of the above mentioned disadvantages with a trailer having a body of smooth continuous interior surface defining the cargo space with supporting means extending the entire transverse dimension of the body and having axle support means at the lower end thereof which supports the axle substantially the entire transverse dimension of the trailer. Also the trailer drawbar is attached directly to the axle of the trailer and, since the axle is supported the entire transverse dimension, the draft loads applied to the drawbar are transmitted across the entire transverse dimension of the trailer body.

Thus, the primary object of the present invention is to provide an inexpensive, light-weight, sturdy dump cart which is easily assembled.

Another object of the present invention is to provide a dump cart supported across the entire transverse dimension and having an axle which is supported substantially the entire transverse dimension to distribute the load across the entire length of the axle.

A further object is to provide a dump cart having a body supported on an axle which is confined substantially throughout its length and which has the drawbar connected directly thereto with the connection to the draft means being vertically adjustable relative to the body.

A further object is to produce a body defining a cargo space for a dump cart which has a smooth interior surface and a removable tailgate which is guided in slots which are virtually self cleaning.

Other objects of this invention will appear in the following description and appended claims, reference being had to the accompanying drawings forming a part of this specification wherein like reference characters designate corresponding parts in the several views.

Brief description of the drawings

FIGURE 4 is an exploded perspective view of the drawbar forming part of the trailer of FIGURE 1;

FIGURE 5 is a horizontal fragmentary sectional view taken generally along lines 5—5 of FIGURE 1;

FIGURE 6 is an enlarged fragmentary view partly in section showing the latch of the present invention carried by the drawbar; and FIGURE 7 is an enlarged fragmentary view of the lower rear corner of the trailer body with the tailgate removed.

Detailed description

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
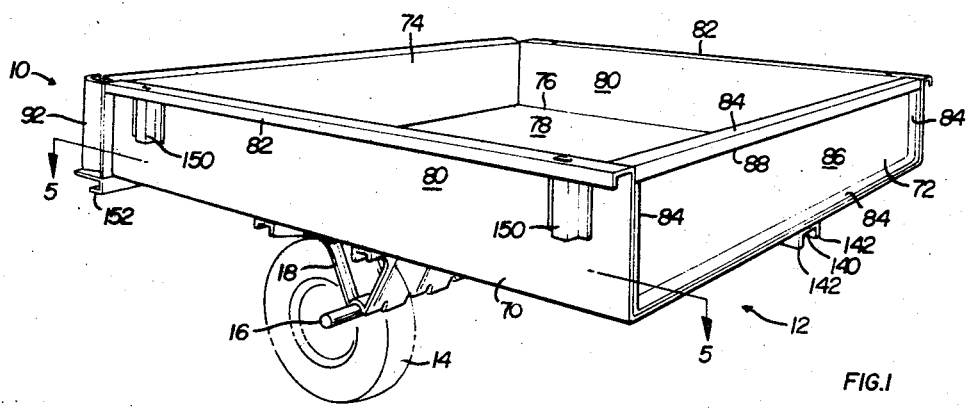
FIGURE 1 shows a perspective view of the dump cart constructed in accordance with the present invention.
Figure 2:
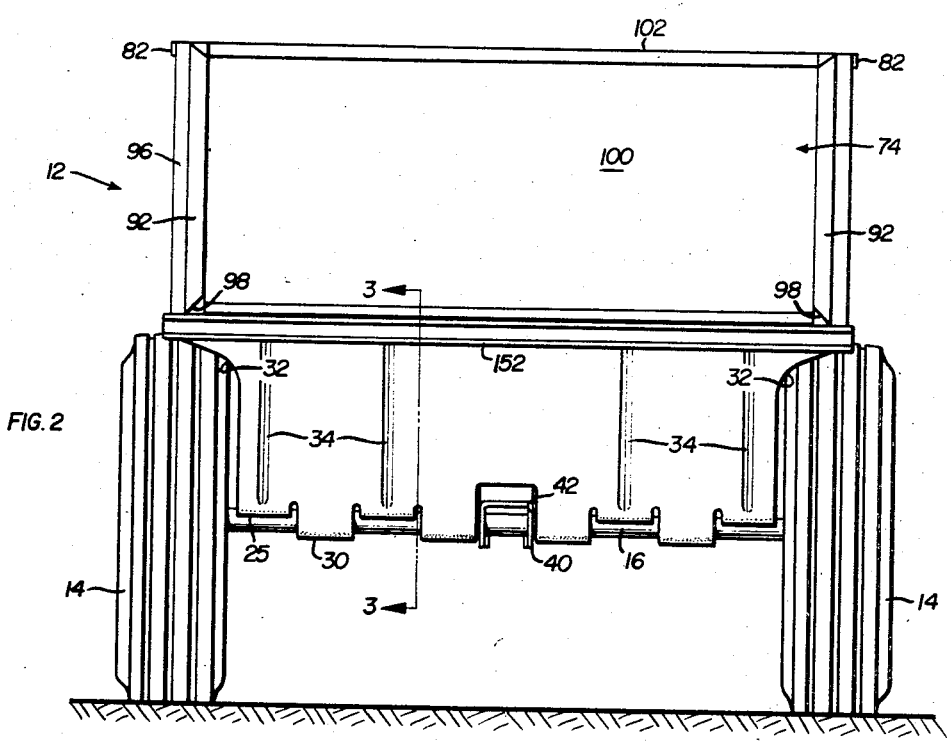
FIGURE 2 is an end view of the rear end of the dump cart shown in FIGURE 1.
Figure 3:
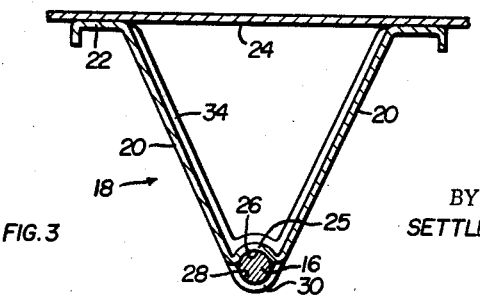
FIGURE 3 is a fragmentary sectional view taken along lines 3—3 of FIGURE 2.

FIGURES 1 and 2 of the drawings show a trailing vehicle, generally designated at 10, having a body portion 12. The body 12 is supported by wheels 14 carried adjacent opposite ends of an axle 16 with an axle support member 18 interposed between the trailer body and the axle.

According to the primary aspect of the present invention, the axle support member 18 is constructed and arranged to produce a continuous support across the entire transverse dimension of the body 12 and also provide a continuous support for substantially the entire length of the axle. For this purpose, the axle support member 18 includes angularly related legs 20 having support flanges 22 at the upper end thereof which are fixedly secured as by welding, to an imperforate surface 24 defined by the body 12, for a purpose which will become apparent hereinafter. The lower end of the legs 18 have integral connecting portions 25 which define spaced downwardly directed recessed portions 26 the inner surfaces of which define substantially half of an opening 28 for the axle 16. Spaced integral loops 30 also interconnect the legs 20 between adjacent pairs of downwardly directed recess portions 25 and define the remaining portion of the opening 28 for the axle 16.

Thus, as seen in FIGURE 2, the entire width or transverse distance of the body is directly supported on the axle support member 18 while substantially the entire length of the axle is contained by the alternate loops 30 and arcuate portions 25.

Preferably the axle support member or means 18 has cut out portions 32 adjacent the opposite ends thereof for the wheels 14. Thus, the wheels 14 will not extend substantially beyond the outer side edges of the body 12. Also, the legs 20 preferably have integral indentations or ribs 34 to define reinforcing means for the axle support member.

According to another aspect of the present invention, the draft means or drawbar 40 is connected directly to the axle 16 (FIGURE 2). For this purpose, a recess 42 is formed intermediate the ends of the axle support member for receiving one end of the drawbar 40. The end of the drawbar received in the recess 42 has aligned openings 44 (FIGURE 4) for rotatably receiving the axle therethrough. Thus, the draft forces applied to the trailer are transmitted across the entire width of the body through the supported axle and the axle support member.

The forward end of the drawbar or draft member includes a hitch connection means 46 for attachment to a draft vehicle, such as a garden tractor. According to another aspect of the present invention, the hitch connection 46 for connection to a draft implement is capable of being adjusted vertically relative to the opposite end of the drawbar 40 thereby accommodating connection to draft vehicles having hitches located at different heights relative to the ground while maintaining the body 12 substantially horizontal. For this purpose, the drawbar 40 (FIGURE 4) includes a first section 48 and a second section 50 adjustably interconnected at the adjacent ends thereof. The adjustable connection for the two sections 48 and 50 includes a first set of holes 52 in the respective sections which are aligned when the rectangular shaped second section 50 is received within the rectangular shaped first section 48. The first section 48 likewise has two sets of openings 54 and 56 which are vertically spaced relative to each other while the second section has corresponding openings 58 and 60 which are disposed on a common horizontal plane with the openings 52.

Thus, in assembling the two sections, bolts 62 are utilized as the adjustable connection with a first pair of bolts 62 received in the aligned openings 52.

If the openings 54 and 58 are aligned and receive bolts therethrough, the drawbar will be in the solid line position shown in FIGURE 6 and the dotted line position of FIGURE 4, while if the openings 56 and 60 are aligned, the drawbar will be in the dotted line position of FIGURE 6 and the solid line position of FIGURE 4. This of course varies the vertical positioning of the hitch connection or draft connecting means 46 while maintaining the body 12 in a horizontal position. Of course, any number of such openings may be supplied to provide any number of vertically adjusted positions of the drawbar hitch connection with respect to the bottom surface of the trailer.

According to a further aspect of the present invention, the entire cargo space is defined by a substantially continuous smooth interior surface on the body. For this purpose, the body 12 includes three imperforate sheets 70, 72 and 74 which are shaped in a manner to be described hereinafter to produce all of the surfaces defining the cargo space without any interruptions in the surfaces or overlapping of adjacent members.

The first sheet or integral imperforate plate is bent from a flat configuration along spaced parallel lines 76 to produce a bottom 78 and spaced vertically extending sides 80. The upper ends of the sides have outwardly directed flanges 82 defining reinforcing means and rails for the body. Thus, it can readily be appreciated that the entire bottom and two sides are formed by a continuous uninterrupted surface.

The second sheet or plate 72 defines the forward end of the cargo space and includes forwardly directed flanges 84 extending from the main body portion 86 with the upper flange 84 having a downwardly directed lip 88. The bottom and two side flanges 84 are directly connected to the forward end of the sheet 70, as by welding or equivalent fastening means so that the inner surface of the main body portion 86 defines the forward end of the cargo space for the body 12. Of course, the upper flange 84 and downwardly directed lip 88 form reinforcing means for the forward end of the dump cart body.

According to a further aspect of the present invention, triangularly shaped guide means are provided for adjacent the rear end of the body for removably receiving the tailgate defined by the third sheet or plate 74. For this purpose, the rear or free ends of the sides 80 are formed by the sheet 76 having outwardly inclined angle portions 89. A pair members 90 are of identical construction and each includes a Z shaped cross-sectional configuration with the innerconnecting web portion 92 fixedly secured to the outer surface of the inclined portion 89, as by welding. One leg 93 of the Z shaped member extends inwardly adjacent the rear end of the sheet 70 to define an acute angle slot or guide 94 while the opposite leg 96 defines reinforcing means for the rear end of the sides 80. The lower end of the leg 92 is notched at 98 to provide a clean out slot for the guide slot 94 as shown in FIGURE 7.

The sheet or plate 74 has a body portion 100 having perpendicularly disposed flanges 102 extending to one side thereof and inclined flanges 104 having inwardly directed lips 106 adjacent the remaining two edges thereof. The acute angle between the flange 104 and associated lip 106 is equal to the included angle between the inclined portion 89 and the leg member 92.

The triangularly shaped slot 94 and guides defined by flanges 104 and lips 106 and received in the slots perform two distinct advantageous functions. Thus, forming the slots 94 in a triangular shape, reduces the size of the opening for movably receiving the tailgate. This considerably reduces the area at the lower end thereof which always accumulates dirt and other debris which will restrict the downward movement of the tailgate and allow or provide a space between the lower end of the tailgate and the upper surface of the bottom of the body. Furthermore, the notches 98 in the leg members 92 will allow virtually all of the debris or dirt and material normally accumulated in the guide slots to be removed during the normal dumping of the trailer. The second advantageous function of the combined angular related slot and guide members is to insure that the tailgate will at all times be installed in the proper position. This necessarily results since the tailgate can only be installed with the main body portion 100 located inwardly of the guides defined by the flanges 104 and lips 106.

According to a further aspect of the present invention, means are provided for releasably retaining the body on the drawbar or draft means 40. As clearly shown in FIGURE 6, the upper surface of the first section 48 of the drawbar 40 has an upwardly directed member 120 fixedly secured thereto, as by welding. The member 120 has an elongated slot 122 and an opening 124. A latch member or plate 126 has a lower offset portion 128 received in the elongated slot 122 and an upper portion 130 adapted to engage the upper surfaces of the flange 84 defining a portion of the body 12. A bolt 132 is received through the opening 124 and an opening defined in the main body portion of the latch 126. A compression spring 134 is telescoped over the free end of the bolt 132 and a nut 136 is threaded on the bolt. Thus, the force of the spring 134 will normally maintain the latch member or means 130 in engaged position with the flange 84 while yielding to a manual force applied to the upper free end of the latch thereby accommodating dumping of the cart, whenever desired.

Preferably, a guide member 140 having outwardly directed or inclined flanges 142 is fixedly secured to the lower end of the body at the forward end thereof to guide and receive the member 120. The body sides 80 may also have port receiving guides 150 for increasing the size of the cargo space when bulky items are being transported. Suitable reinforcing means such as a rearwardly directed channel 152 may also be provided adjacent the lower rear end of the body 12.

From the above description it is readily apparent that the improved trailer design is of very light weight construction and provides a completely smooth interior cargo space entirely devoid of bolt heads, lap edges or other protrusions heretofore necessary due to the specific manner of design of trailer bodies. The axle support is fixedly secured to an imperforate portion of the body and the weight of the load is transmitted to substantially the entire length of the axle. The triangularly shaped guides and cooperating ends of the tailgate makes it impossible to install the tailgate backwards while the notched bottoms of the guides significantly reduce material residue accumulation thus insuring improved tailgate sealing. The adjustable tongue allows for attachment to draft vehicles having attaching points of differing height while at all times maintaining the body of the trailer horizontal and the manner of supporting the body allows for dumping angles of at least 40° with wheels of 4.00–8 tires. The spring loaded trip latch allows for automatic locking of the trailer body in the transport or loading position.

While one exemplary embodiment of the invention has been described in detail, it will be apparent to those skilled in the art that the disclosed embodiment may be modified.

What is claimed is:

1. A dump cart having an elongated body defining a cargo space, spaced wheels adjacent opposite ends of an axle and a support interposed between said axle and said body, the improvement of said support comprising a member fixedly secured to a lower imperforate surface of said body and terminating below said lower surface, the member at the lower end thereof having integrally formed therein spaced loop-like axle engaging portions defining an opening surrounding said axle along a portion thereof and of substantially the same diameter as said axle, said axle engaging portions supporting said axle substantially the entire length between said wheels.

2. A dump cart as defined in claim 1, in which said axle engaging portions include spaced loops and downwardly opening recesses intermediate said loops, said loops and recesses having surfaces defining an opening substantially equal to the diameter of said axle whereby said loop surfaces support said axle on one side of the axis of said axle and said recess surfaces support the axle on an opposed side of said axis.

3. A dump cart as defined in claim 1, in which said body comprises a flat imperforate sheet bent along spaced parallel lines with the portion intermediate said bend lines defining said bottom and the portions beyond said bend lines defining opposed sides of said cargo space, first end means defining an imperforate uninterrupted surface adjacent one end and connected to said sheet to define one end of said cargo space, and second end means supported adjacent said opposite end of said sheet to define the opposite end of said cargo space.

4. A dump cart as defined in claim 3, in which said second end means comprises a removable tailgate including a body portion having outwardly inclined flanges adjacent thereof and means defining acute angle guides on the adjacent ends of said sides for respectively receiving said flanges.

5. A dump cart as defined in claim 1, in which said body comprises an integral imperforate sheet bent to a U-shaped configuration to define a continuous uninterrupted surface including the bottom and sides of said cargo space, a second imperforate sheet having a main portion corresponding to the cross-section of said U-shaped sheet, said second sheet defining one end of said cargo space and having perpendicular integral flanges extending from said main portion, outwardly inclined end portions at the free ends of said sides, means cooperating with said inclined end portions for defining acute angle guide slots on the free ends of said sides, and a tailgate having a flat imperforate portion defining the opposite end of said cargo space, said tailgate having guide portions extending from said imperforate portion and conforming in configuration to said guide slots.

6. A dump cart as defined in claim 1, including the further improvement of means defining acute angle slots on said sides at said opposite ends, said tailgate having integral portions at opposite ends thereof defining acute angle guides slidably received in said slots.

7. A dump cart comprising an elongated body defining a cargo space, spaced wheels adjacent opposite ends of an axle, a support interposed between said axle and said body, said support including a member fixedly secured to a lower imperforate surface of said body and terminating below said surface, means at the lower end of said member defining axle engaging portions, said axle engaging portions supporting said axle substantially the entire length between said wheels, a drawbar, means defining a downwardly directed recess on the lower end of said member intermediate the ends thereof for receiving an end of said drawbar, and means on said end of said drawbar for receiving said axle whereby said axle engaging means will resist distortion of said axle when draft forces are applied to said drawbar.

8. A dump cart as defined in claim 7, in which said drawbar comprises a first section having said one end and a section having an opposite end for attachment to a draft vehicle, the further improvement of means adjustably interconnecting said sections whereby to vary the vertical relation of said ends for maintaining said body substantially horizontal while accommodating attachment at varying vertical points on the vehicle.

9. A dump cart as defined in claim 7, including the further improvement of latch means interposed between said drawbar and said body, said latch means comprising a member carried by said drawbar and having a slot therein, a latch plate having an offset portion at one end thereof received in said slot and defining a pivot for said plate, latch means at the opposite end of said plate, and biasing means interposed between said member and said plate and normally maintaining said plate in a first position wherein said latch means engages a portion of said body to lock said body to said drawbar but yieldable to a second position to allow said body to be moved relative to said drawbar.

10. A dump cart comprising an elongated body defining a cargo space, spaced wheels adjacent opposite ends of an axle, said body having an integral imperforate sheet bent to a U-shaped configuration to define a continuous uninterrupted surface including the bottom and sides of said cargo space, a second imperforate sheet having a main portion corresponding to the cross-section of said U-shaped sheet, said second sheet defining one end of said cargo space and having perpendicular integral flanges extending from said main portion, outwardly inclined end portions at the free ends of said sides, means cooperating with said inclined end portions for defining acute angle guide slots on the free ends of said sides, said means including a pair of flat members respectively secured to said inclined portions, said members extending towards each other and terminating adjacent planes defined by said sides of the cargo space, said members having inclined ends cooperating with the bottom of said cargo space to define cleaning notches for said guide slots, a support interposed between said axle and said body, said support including a member fixedly secured to a lower imperforate surface of said body and terminating below said lower surface, means at the lower end of said body defining axle engaging portions, said axle engaging portions supporting said axle substantially the entire length between said wheels, and a tailgate having a flat imperforate portion defining the opposite end of said cargo space, said tailgate having guide portions extending from said imperforate portion and conforming in configuration to said guide slots.

11. A dump cart having a body defining a cargo space and supported on an axle by ground engaging means, comprising a first imperforate sheet bent to define a flat bottom and spaced upwardly extending sides of said cargo space, an imperforate plate having perpendicular integral flanges attached to said sheet at one end thereof and defining one end of said cargo space, a removable tailgate received between said sides at the opposite end of said sheet and having a flat imperforate portion defining the opposite end of said cargo space, a support member having a continuous contact with bottom between said sides and having ends thereof extending downwardly therefrom, and means at the lower end of said support member and integral therewith defining spaced loop-like openings surrounding and receiving said axle and having said ground engaging members at opposite ends whereby said body is supported along the entire transverse dimension of said bottom.

12. A dump cart as defined in claim 11, in which said sheet, said flat imperforate plate and said tailgate each having outwardly directed integral flanges at the upper end of said cargo space to define a substantially continuous reinforcing means for said body.

13. A dump cart comprising a body defining a cargo space and supported on an axle by ground engaging means, the body including a first imperforate sheet bent to define a flat bottom and spaced upwardly extending sides of said cargo space, an imperforate plate having perpendicular integral flanges attached to said sheet at one end thereof and defining one end of said cargo space, a removable tailgate received between said sides at the opposite end of said sheet and having a flat imperforate portion defining the opposite end of said cargo space, a support member having a continuous contact with the bottom between said sides and extending downwardly therefrom, means at the lower ends of said support members defining a substantially continuous opening for receiving said axle having said ground engaging means at opposite ends whereby said body is supported along the entire transverse dimension of said bottom, draft means having a rotatable connection at one end with said axle intermediate the ends thereof and having an opposite end adapted to be connected to a draft vehicle, and latch means on said draft means cooperating with said one end of said body for releasably connecting said body to said draft means and allowing said body to be pivoted about said axle when said latch means is released.

14. A dump cart as defined in claim 13, including the further improvement of said draft means comprising first and second sections adjustably interconnected to allow for vertical adjustment of said opposite end while maintaining said body at a predetermined attitude with respect to the ground.

15. A dump cart as defined in claim 13, including the further improvement of latch means interposed between said body and said draft means for releasably maintaining said body in a fixed position with respect to said draft means, said latch means comprising a latch member fixed to said draft means and having an elongated slot, a latch plate having an offset portion at opposite ends thereof with one portion received in said slot and defining a pivot axis and said second portion defining latch means for engaging one of said flanges, and biasing means interposed between said plate and latch member normally maintaining said latch means in engagement with said flange.

16. A dump cart comprising a body defining a cargo space and supported on an axle by ground engaging means, the body including a first imperforate sheet bent to define a flat bottom and spaced upwardly extending sides of said cargo space, an imperforate plate having perpendicular integral flanges attached to said sheet at one end thereof and defining one end of said cargo space, a removable tailgate received between said sides at the opposite end of said sheet and having a flat imperforate portion defining the opposite end of said cargo space, a support member having a continuous contact with bottom between said sides and extending downwardly therefrom, said support member including angularly related legs depending from said bottom, and means at the lower end of said support member defining a substantially continuous opening for receiving said axle having said ground engaging members at opposite ends whereby said body is supported along the entire transverse dimension of said bottom, said means comprising first integral portions between said legs at spaced areas along said legs and having downwardly directed recesses defining approximately an upper half of said opening and second integral portions interconnecting said legs between adjacent first integral portions and having upwardly directed recesses defining approximately a lower half of said opening.

References Cited

UNITED STATES PATENTS

| 1,539,492 | 5/1925 | Jefferis | 296—52 |
| 1,659,245 | 2/1928 | Delker | 298—17 |
| 2,880,034 | 3/1959 | Kamlukin | 298—5 |
| 3,016,268 | 1/1962 | Hadden | 298—5 X |

FOREIGN PATENTS

| 109,224 | 3/1925 | Switzerland. |
| 602,171 | 7/1960 | Canada. |

RICHARD J. JOHNSON, Primary Examiner

U.S. Cl. X.R.

280—63, 47.26, 490